(No Model.)
J. T. EICHELBERGER.
FISH HOOK.
No. 463,032. Patented Nov. 10, 1891.
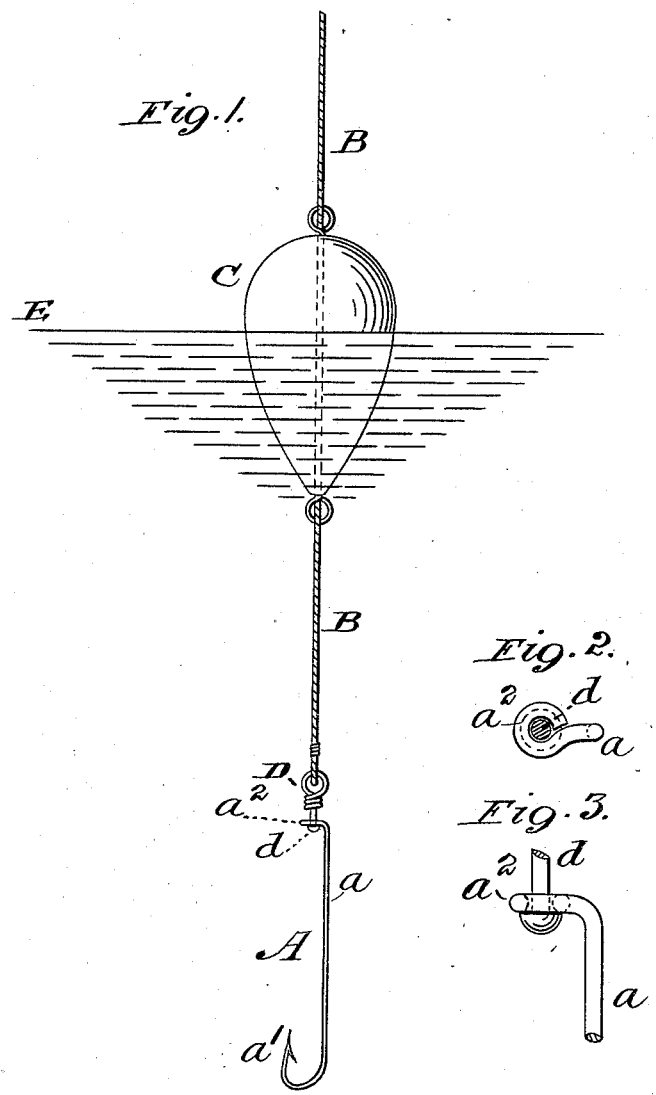
WITNESSES
Edward W Furrell
A. Bonville
INVENTOR
John T. Eichelberger
by C D Moody
his atty

UNITED STATES PATENT OFFICE.

JOHN T. EICHELBERGER, OF ST. LOUIS, MISSOURI.

FISH-HOOK.

SPECIFICATION forming part of Letters Patent No. 463,032, dated November 10, 1891.

Application filed June 12, 1891. Serial No. 396,052. (No model.)

*To all whom it may concern:*

Be it known that I, JOHN T. EICHELBERGER, of St. Louis, Missouri, have made a new and useful Improvement in Fish-Hooks, of which the following is a full, clear, and exact description.

My improvement has for its object to prevent or to lessen the liability of the twisting of the line attached to the hook, a difficulty frequently experienced in fishing, and especially when live bait is being used. I overcome the difficulty referred to by so connecting the hook with its line that the hook can be turned around horizontally without imparting its motion to the line, substantially as is hereinafter described and claimed, aided by the annexed drawings, making part of this specification, in which—

Figure 1 is an elevation exhibiting the improved hook attached to a line as in use; and Figs. 2 and 3 details upon an enlarged scale, Fig. 2 being a horizontal section on the line 2 2 of Fig. 3, which is a side elevation showing the upper end of the hook and the lower portion of the swivel to which the hook is immediately attached.

The same letters of reference denote the same parts.

The hook A, line B, and float C are of the usual construction, saving as modified or supplemented by the improvement under consideration. At its upper end the shank $a$ of the hook is extended horizontally, or thereabout, and preferably in the direction of the general plane of the barb $a'$ of the hook, and is provided with or shaped to form an eye $a^2$, which in conjunction with the ring D, having the headed pin $d$ engaging in said eye, as shown, constitutes a swivel, which connects the hook with the line, substantially as shown. Thus connected the hook can turn around freely upon the pin $d$ without drawing the line with it, and the twisting or kinking of the line is thereby avoided. At the same time any downward pull upon the hook is transmitted to the line and float and is at once made manifest by the movement of the float in the water E, in the usual manner.

I desire not to be restricted to any special form of swivel construction for uniting the hook and line; but I regard the construction exhibited as being desirable, partly because of its simplicity and cheapness and partly because a downward strain exerted upon the barb of the hook is by reason of the eye $a^2$ being turned, as described, transmitted to a point more directly over the barb than is the case in the use of an ordinary fish-hook, and partly because the overhanging eye and line is of assistance in preventing the fouling of the barb when the hook is raised.

I claim—

1. The hook A, the upper end of its shank turned horizontally and having an eye $a^2$, combined with the ring D, having headed pin $d$ engaging in said eye $a^2$, as and for the purposes set forth.

2. The fish-hook having the eye turned, as described, the ring D, having the headed pin $d$, the line, and the float, substantially as described.

Witness my hand this 5th day of June, 1891.

JOHN T. EICHELBERGER.

Witnesses:
C. D. MOODY,
A. BONVILLE.